2,820,783

CUPRIFEROUS DISAZO-DYESTUFFS

Henri Riat, Arlesheim, Switzerland, assignor to Ciba Limited, Basel, Switzerland, a Swiss firm No Drawing. Application June 7, 1954
Serial No. 435,094

Claims priority, application Switzerland June 12, 1953

10 Claims. (Cl. 260—148)

This invention provides new cupriferous disazodyestuffs which, for example, like the dyestuff of the formula (1)
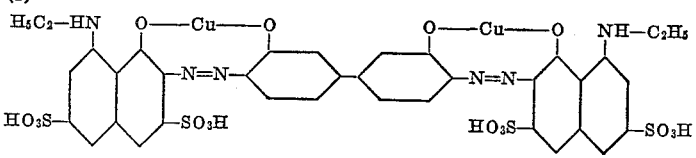

correspond to the general formula (2)
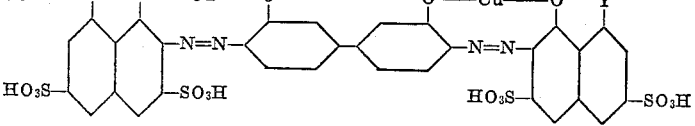

in which Y represents an alkylamino group which is advantageously of low molecular weight and may contain further substituents.

The invention also includes a process for making the aforesaid cupriferous disazo-dyestuffs, wherein a disazodyestuff of the formula (3)
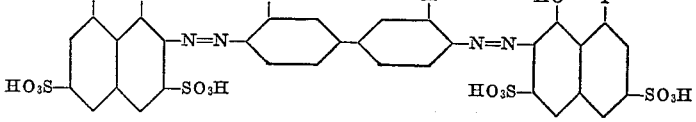

in which X represents a hydroxyl group or a substituent convertible into a hydroxyl group, and Y represents an alkylamino group which is advantageously of low molecular weight and may contain further substituents, is treated with an agent yielding copper in such manner that the corresponding bis-(ortho:ortho' - dihydroxyazo) - copper complex is obtained, when necessary, accompanied by the conversion of the substituent X into a hydroxyl group.

The disazo-dyestuffs of the Formula 3 used as starting materials in the present process can be made by coupling a tetrazotized diamine of the formula (4)
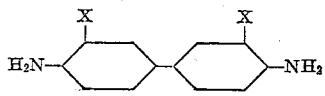

on both sides with coupling components of the constitution (5)
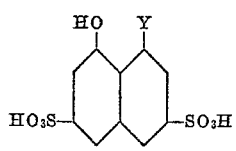

X and Y in the Formulae 4 and 5 having the meanings given above.

As diamines of the Formula 4 there are used 4:4'-diaminodiphenyl compounds, which contain in the 3- and 3'-positions either a hydroxyl group or a substituent convertible into a hydroxyl group, such as a halogen atom for example, chlorine, or an alkoxy group of lower molecular weight, advantageously a methoxy group. Accordingly, there may be mentioned as diamines, for example, 3:3' - dihydroxy - 4:4'-diaminodiphenyl,3:3-dichloro-4:4'-diaminodiphenyl, 3:3'-diethoxy-4:4' - diaminodiphenyl, and especially 3:3'-dimethoxy-4:4'-diaminodiphenyl.

The alkylamino group Y in the coupling components in the Formula 5 may be a dialkylamino group or more especially a monoalkylamino group. There come into consideration alkylamino groups containing saturated or unsaturated aliphatic hydrocarbon radicals and the latter may contain substituents, for example, cyano, hydroxyl or alkoxy groups or aryl radicals. In general it is of advantage to use coupling components of the Formula 5 which contain an alkylamino group of which the alkyl radical contains only a few, for example, 1–4 carbon atoms. Valuable results are obtained, for example, with coupling components of the aforesaid kind in which the alkylamino groups contain one or two hydroxyl groups as substituents in the alkyl radical. Such alkyl radicals advantageously have the constitution

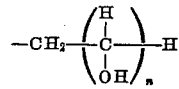

in which $n$ represents the whole number 1 or 2.

As examples of suitable coupling components there may be mentioned the following compounds: 1-methylamino- or 1-ethylamino-8-hydroxynaphthalene - 3:6-disulfonic acid, 1-dimethylamino-8-hydroxynaphthalene-3:6-disulfonic acid, 1-(β-hydroxyethylamino)-8-hydroxynaphthalene-3:6 - disulfonic acid, 1 - isopropylamino- or 1 - isobutylamino - 8 - hydroxynaphthalene-3:6-disulfonic acid, 1-(β:γ-dihydroxypropylamino) - 8 - hydroxynaphthalene-3:6-disulfonic acid, 1-(β- or γ-hydroxypropyl)-amino-8-hydroxynaphthalene - 3:6-disulfonic acid, 1-n-propylamino-8-hydroxynaphthalene - 3:6-disulfonic acid, 1-allylamino-8-hydroxynaphthalene - 3:6-disulfonic acid, 1-(β-methoxyethylamino) - 8 - hydroxynaphthalene-3:6-disulfonic acid and 1-benzylamino-8-hydroxynaphthalene-3:6-disulfonic acid.

The coupling components of the Formula 5 can be obtained by methods in themselves known, for example, by alkylating 1-amino-8-hydroxynaphthalene-3:6-disulfonic acid. 1-mono- or 1-di-(hydroxyalkylamino-8-hydroxynaphthalene-3:6-disulfonic acids can be obtained, with advantage, for example, by reacting the amino-sulfonic acids with hydroxyalkylhalides, advantageously in an aqueous medium and in the presence of an acid-binding agent. Depending on the reaction conditions, the choice of the acid-binding agent and the quantity of the hydroxyalkyl halide 1-mono- or di-(hydroxyalkylamino)-8-hydroxynaphthalene disulfonic acids can be obtained. Mixtures of 1-mono- and di-(hydroxyalkylamino)-8-hydroxynaphthalene disulfonic acids can also be obtained in this manner, and these mixtures may also be used as coupling components for preparing the starting materials for the present process.

The coupling of the tetrazotized amine of the Formula 4 with the coupling components of the Formula 5 may be carried out by methods in themselves known. Tetrazotized 3:3'-dihalogen- or 3:3'-dialkoxy-4:4'-diaminodiphenyl compounds are advantageously coupled in an alkaline medium, for example a medium rendered alkaline with an alkali carbonate, and for coupling tetrazotized 3:3'-dihydroxy-4:4'-diaminodiphenyl a strongly alkaline medium is indicated, for example, a medium rendered alkaline with an alkali hydroxide or an alkaline earth metal hydroxide, and/or these couplings are advantageously assisted by suitable additions, such as alcohol or pyridine.

The treatment with the agent yielding copper may also be carried out in known manner. In all cases it must be carried out in such manner that the corresponding bis-(ortho:ortho'-dihydroxy-azo)-copper complex is obtained, and it is known that the reaction conditions must usually be more energetic when an ortho-alkoxy-ortho'-hydroxy-azo-grouping or an ortho-halogen-ortho'-hydroxy-azo-grouping is present, than when an ortho':ortho'-dihydroxy-azo-grouping is present. While it is generally satisfactory to carry out the metallization in a weakly acid medium, for example, with copper sulfate with the addition of sodium acetate, in the case of an ortho:ortho'-dihydroxy-azo-grouping, in other cases it is recommended to carry out the metallization with complex copper ammine compounds, for example, copper tetrammine compounds obtained with ammonia, pyridine, an alkylamine or a hydroxyethylamine.

The cupriferous dyestuffs so obtained correspond to the above Formula 2. The latter formula as well as the Formula 1 undoubtedly represents the stoichiometric quantity of copper and the correct position of the copper atom in the complex, but the distribution of the main and secondary valences in the complex union of the copper to the dyestuff has not yet been established with certainty.

The new cupriferous dyestuffs of the Formula 2 are suitable for dyeing and printing a very wide variety of materials, especially cellulose-containing materials such as cotton, linen, and artificial silk or staple fibers of regenerated cellulose. The dyeings are distinguished by their good fastness to light and in general by other good properties of fastness, for example, a relatively good fastness to acid and perspiration. The new dyestuffs are also especially valuable because in general they yield extraordinarily greenish blue tints, which it was not possible to obtain with the dyestuffs of similar type hitherto known. The tints of the dyeings are well maintained in artificial light. Viscose artificial silk that normally yields streaky dyeings is uniformly dyed by the new dyestuffs.

The following examples illustrate the invention, the parts and percentages being by weight:

*Example 1*

24.4 parts of 3:3'-dimethoxy-4:4'-diaminodiphenyl are tetrazotized in the usual manner, and the tetrazo-compound is introduced while cooling with ice into a solution rendered alkaline with sodium carbonate of 74 parts of 1-($\beta$-hydroxyethyl)-amino-8-hydroxynaphthalene-3:6-disulfonic acid. When the coupling is finished the solution is heated to 70° C., and the disazo-dyestuff is precipitated by the addition of sodium chloride and filtered off. It dissolves in water with a blue coloration and dyes cotton blue tints.

In order to convert the dyestuff into its copper complex, the dyestuff paste is dissolved in 1500 parts of water and mixed with 50 parts of monoethanolamine. A solution of 55 parts of crystalline copper sulfate, 80 parts of ammonia solution of 25 percent strength and 100 parts of water are then added, and the whole is heated for 14 hours, while stirring and refluxing, on a boiling water bath. The copper complex so formed which corresponds to the formula

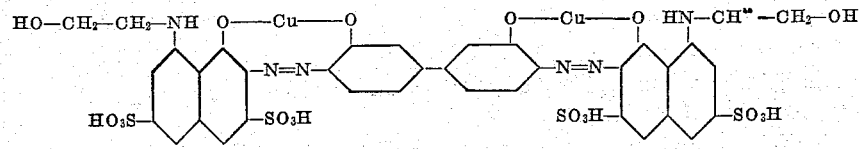

is then salted out by the addition of sodium chloride, filtered off and dried. The dyestuff is a dark powder which dissolves in water with a greenish blue coloration and dyes cotton clear greenish-blue tints.

The 1-($\beta$-hydroxyethyl)-amino-8-hydroxynaphthalene-3:6-disulfonic acid used in this example is obtained by reacting ethylene chlorhydrin or ethylene oxide (about 1.5 mols) with 1-amino-8-hydroxynaphthalene-3:6-disulfonic acid (1 mol) in aqueous solution and in the presence of calcium carbonate at the boiling temperature.

Similar dyestuffs, which likewise dye cotton green-blue tints, are obtained by the procedure described above except that, instead of 1-($\beta$-hydroxyethyl)-amino-8-hydroxynaphthalene-3:6-disulfonic acid, the corresponding quantity of one of the following coupling components is used:

(1) 1-ethylamino-8-hydroxynaphthalene-3:6-disulfonic acid,
(2) 1-isopropylamino-8-hydroxynaphthalene-3:6-disulfonic acid,
(3) 1-isobutylamino-8-hydroxynaphthalene-3:6-disulfonic acid,
(4) 1-allylamino-8-hydroxynaphthalene-3:6-disulfonic acid,
(5) 1-benzylamino-8-hydroxynaphthalene-3:6-disulfonic acid,
(6) 1-($\beta$-hydroxypropyl)-amino-8-hydroxynaphthalene-3:6-disulfonic acid,
(7) 1-($\gamma$-hydroxypropyl)-amino-8-hydroxynaphthalene-3:6-disulfonic acid,
(8) 1-($\beta$:$\gamma$-dihydroxypropyl)-amino-8-hydroxynaphthalene-3:6-disulfonic acid,
(9) 1-($\beta$-cyanoethyl)-amino-8-hydroxynaphthalene-3:6-disulfonic acid,
(10) 1-($\beta$-methoxyethyl)-amino-8-hydroxynaphthalene-3:6-disulfonic acid,
(11) 1-methylamino-8-hydroxynaphthalene-3:6-disulfonic acid.

These coupling components can all be made, in a manner analogous to 1-($\beta$-hydroxyethyl)-amino-8-hydroxynaphthalene-3:6-disulfonic acid, from 1-amino-8-hydroxynaphthalene-3:6-disulfonic acid and the corresponding alkyl halide or hydroxy-alkyl halide or acrylonitrile (No. 9).

*Example 2*

21.6 parts of 3:3-dihydroxy-4:4'-diaminodiphenyl are tetrazotized. The tetrazo-compound is neutralized with sodium carbonate and filtered off, and then introduced into a mixture of 84 parts of 1-benzylamino-8-hydroxynaphthalene-3:6-disulfonic acid, 100 parts of water, 100 parts of an aqueous suspension of calcium hydroxide of 25 percent strength and 50 parts of pyridine or picoline. The whole is stirred for 12 hours at 10–15° C. The disazo-dyestuff formed is isolated by acidification and separation by filtration, and it is converted into its copper complex by heating it for one hour at 70° C. with an ammoniacal solution of copper sulfate (corresponding to 50 parts of $CuSO_4.5H_2O$). The copper complex is worked up in the usual manner and dried. It is a blackish powder, which dissolves in water with a blue coloration and dyes cotton greenish blue tints.

*Example 3*

24.4 parts of 3:3'-dimethoxy-4:4'-diaminodiphenyl are tetrazotized, and the tetrazo compound is coupled in a solution, rendered alkaline with sodium carbonate, of 35 parts of 1-ethylamino-8-hydroxynaphthalene-3:6-disulfonic acid. To the so-obtained diazo-monoazo compound a solution, rendered alkaline with sodium carbonate, of 36.3 parts of 1-(β-oxyethyl)-amino-8-hydroxynaphthalene-3:6-disulfonic acid is added. When the coupling is finished the disazo dyestuff is isolated in known manner and converted into its copper complex according to the method described in Example 1. The copper complex dyes cotton pure greenish blue tints.

*Example 4*

100 parts of cotton are entered at 40° C. into a dyebath which contains in 3000 parts of water 0.5 part of the cupriferous dyestuff obtained as described in the first and second paragraphs of Example 1. Dyeing is carried on for ½ hour while raising the temperature to 90° C., 30 parts of crystalline sodium sulfate are added, and then dyeing is continued for a further ½ hour at 90–95° C. The cotton is then rinsed and finished in the usual manner. There is obtained a pure greenish blue dyeing which is fast to light.

The formulae of some of the claims contain twice the symbol "Y." It is to be understood that these claims encompass not only symmetrical, but also asymmetrical dyestuffs wherein the Y's are different from one another although each Y should be consistent with the definition given in the particular claim.

What is claimed is:

1. A cupriferous disazo-dyestuff of the formula

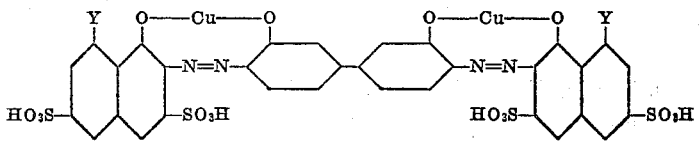

in which Y represents an alkylamino group.

2. A cupriferous disazo-dyestuff of the formula

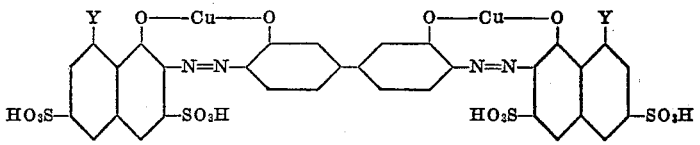

in which Y represents an amino group substituted by a member selected from the group consisting of a benzyl radical, an aliphatic hydrocarbon radical containing at the most four carbon atoms, a hydroxyalkyl radical containing at the most two hydroxyl groups and at least two but at the most three carbon atoms, an alkoxyalkyl group containing at the most four carbon atoms, and a cyanoalkyl radical containing at the most four carbon atoms.

3. A cupriferous disazo-dyestuff of the formula

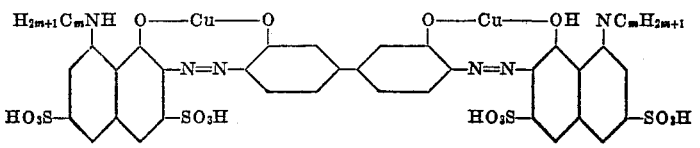

in which $m$ represents a whole number of at the most 4.

4. A cupriferous disazo-dyestuff of the formula

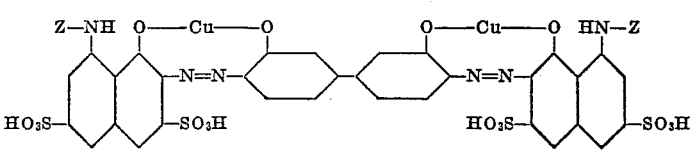

in which Z represents a hydroxyalkyl radical containing at the most two hydroxyl groups and at least two but at the most three carbon atoms.

5. A cupriferous disazo-dyestuff of the formula

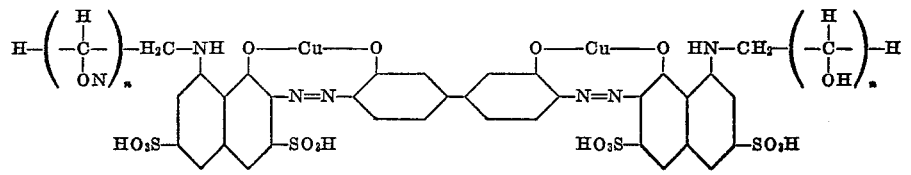

in which $n$ represents a whole number of at the most 2.

6. The cupriferous disazo-dyestuff of the formula

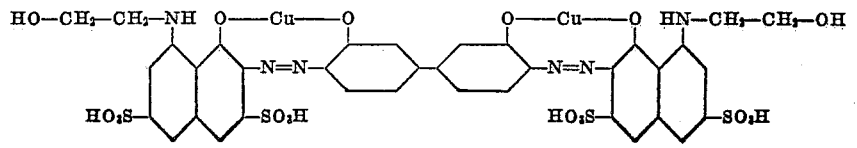

7. The cupriferous disazo-dyestuff of the formula
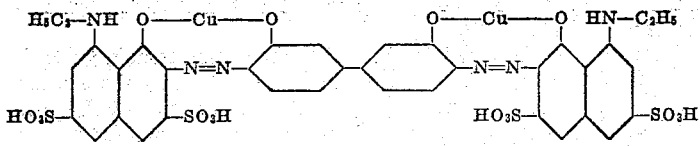
8. The cupriferous disazo-dyestuff of the formula
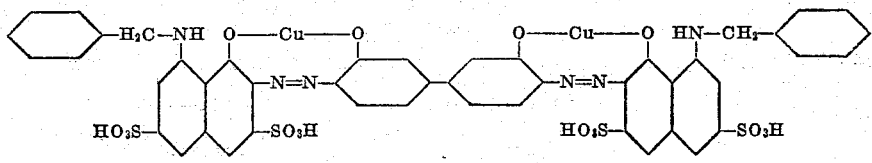
9. The cupriferous disazo-dyestuff of the formula
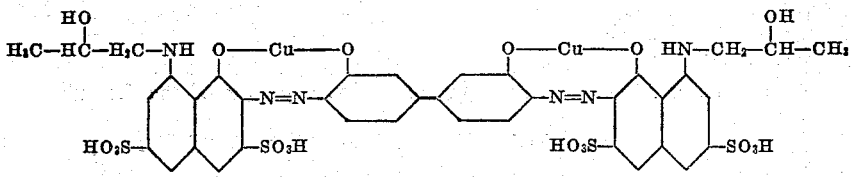
10. The cupriferous disazo-dyestuff of the formula
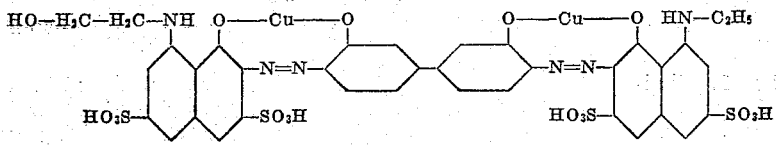
References Cited in the file of this patent
UNITED STATES PATENTS
| | | |
|---|---|---|
| 2,424,066 | Straub et al. | July 15, 1947 |
| 2,426,977 | Straub et al. | Sept. 9, 1947 |
FOREIGN PATENTS
| | | |
|---|---|---|
| 267,049 | Switzerland | July 1, 1950 |

UNITED STATES PATENT OFFICE
Certificate of Correction

Patent No. 2,820,783 January 21, 1958

Henri Riat

It is hereby certified that error appears in the printed specification of the above numbered patent requiring correction and that the said Letters Patent should read as corrected below.

Columns 3 and 4, lines 15 to 22, right-hand portion of the formula should appear as shown below instead of as in the patent—

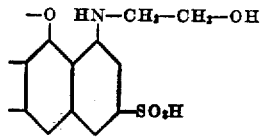

columns 5 and 6, claim 3, the right-hand portion of the formula should appear as shown below instead of as in the patent—

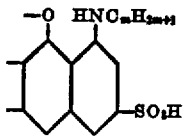

same columns 5 and 6, claim 5, the upper left-hand portion of the formula should appear as shown below instead of as in the patent—

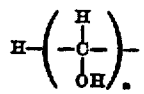

Signed and sealed this 10th day of June 1958.

[SEAL]

Attest:
KARL H. AXLINE,
Attesting Officer.

ROBERT C. WATSON,
Commissioner of Patents.